US010986096B2

(12) United States Patent
Dos Santos et al.

(10) Patent No.: US 10,986,096 B2
(45) Date of Patent: Apr. 20, 2021

(54) METHOD FOR ADMINISTERING A COMMUNICATION CHANNEL BETWEEN TWO HOST COMPONENTS OF A MOBILE NFC DEVICE

(71) Applicant: IDEMIA FRANCE, Colombes (FR)

(72) Inventors: Elder Dos Santos, Colombes (FR); Damien Lieupart, Colombes (FR)

(73) Assignee: IDEMIA FRANCE, Courbevoie (FR)

( * ) Notice: Subject to any disclaimer, the term of this patent is extended or adjusted under 35 U.S.C. 154(b) by 223 days.

(21) Appl. No.: 16/076,465

(22) PCT Filed: Feb. 6, 2017

(86) PCT No.: PCT/FR2017/050269
§ 371 (c)(1),
(2) Date: Aug. 8, 2018

(87) PCT Pub. No.: WO2017/137688
PCT Pub. Date: Aug. 17, 2017

(65) Prior Publication Data
US 2019/0052642 A1 Feb. 14, 2019

(30) Foreign Application Priority Data
Feb. 9, 2016 (FR) ...................................... 1651009

(51) Int. Cl.
*H04L 29/06* (2006.01)
*H04W 12/08* (2021.01)
(Continued)

(52) U.S. Cl.
CPC ............. *H04L 63/101* (2013.01); *H04B 5/02* (2013.01); *H04W 4/80* (2018.02); *H04W 12/08* (2013.01); *H04W 76/11* (2018.02); *H04W 76/18* (2018.02)

(58) Field of Classification Search
USPC .............................................................. 726/4
See application file for complete search history.

(56) References Cited

U.S. PATENT DOCUMENTS

| 2010/0207742 A1* | 8/2010 | Buhot ...................... H04B 5/06 340/10.51 |
| 2013/0138608 A1* | 5/2013 | Smith .................. G06F 16/1787 707/610 |

(Continued)

FOREIGN PATENT DOCUMENTS

| EP | 2 846 473 A1 | 3/2015 |
| EP | 2 975 775 A1 | 1/2016 |

OTHER PUBLICATIONS

Coskun et al., "The Survey on Near Field Communication", NFC Lab-Istanbul, Department of Information Technologies, ISIK University, Istanbul 34980, Turkey, Received: Apr. 14, 2015 / Accepted: Jun. 2, 2015 / Published: Jun. 5, 2015 (Year: 2015).*

(Continued)

*Primary Examiner* — Khalil Naghdali
(74) *Attorney, Agent, or Firm* — Nixon & Vanderhye

(57) ABSTRACT

Disclosed is a method for administering a communication channel between two host components of a mobile NFC device. The method includes a step of updating the whitelist of a first host component, then a step of notifying the update to a second authorised host component. The notifying step informs the second host component of the status of the whitelist of the first host component in order to prevent the transmission of requests to create a communication channel which would then be rejected. Also disclosed is a mobile NFC device.

15 Claims, 2 Drawing Sheets

(51) Int. Cl.
   *H04W 4/80*      (2018.01)
   *H04W 76/18*     (2018.01)
   *H04W 76/11*     (2018.01)
   *H04B 5/02*      (2006.01)

(56) References Cited

U.S. PATENT DOCUMENTS

| | | | |
|---|---|---|---|
| 2014/0032691 A1* | 1/2014 | Barton | G06F 21/604 |
| | | | 709/206 |
| 2015/0017909 A1 | 1/2015 | Meunier et al. | |
| 2015/0033289 A1* | 1/2015 | Caceres | H04W 12/08 |
| | | | 726/3 |
| 2015/0280787 A1* | 10/2015 | Lerch | H04W 4/80 |
| | | | 455/41.1 |
| 2019/0245900 A1* | 8/2019 | Teng | H04L 67/16 |

OTHER PUBLICATIONS

"Smart Cards; UICC—Contactless Front-end (CLF) Interface; Host Controller Interface (HCI) (Release 12)", Technical Specification, European Telecommunications Standards Institute (ETSI), 650, Route Des Lucioles ; F-06921 Sophia-Antipolis ; France, vol. SCP TEC, No. V12.1.0, Oct. 31, 2014 (Oct. 31, 2014), XP014223302.
International Search Report, dated Apr. 5, 2017, from corresponding PCT/FR2017/050269 application.

* cited by examiner

METHOD FOR ADMINISTERING A COMMUNICATION CHANNEL BETWEEN TWO HOST COMPONENTS OF A MOBILE NFC DEVICE

The field of the invention relates to an NFC (for 'near field communication') mobile device and to a method for administering a communication channel to a first host component.

BACKGROUND OF THE INVENTION

A person skilled in the art knows that an NFC mobile device comprises a wireless radiofrequency communication NFC integrated circuit with a short range, of around a few centimeters, in order to operate secure services, for example authorizing use of a service, payment, transport, etc. It is provided that the NFC integrated circuit, also called CLF (for 'contactless front end') component, communicates with a plurality of electronic components that are situated within the NFC mobile device, for example a UICC (for 'universal integrated circuit card') card or else an embedded secure element of eSE type, or else externally, for example with an external contactless reader, or else also with elements that are added to the NFC mobile device, for example an additional memory card, in order to operate the secure services. It is necessary to govern communications between these electronic components.

To this end, the European Telecommunications Standards Institute, ETSI, has provided the technical specification ETSI TS 102 622, the latest version (V12.1.0) dating from October 2014. The technical specification describes the logic interface that authorizes NFC applications to operate in one or more electronic components, called host components, of the NFC mobile device. This host control interface architecture is called 'host controller interface'. More precisely, a host component may be for example an embedded secure element of eSE type, a SIM (for 'subscriber identification module') card for identification on a mobile telephony network, or a baseband component of the NFC device. A host controller, hosted in the CLF component, is provided in order to administer communication channels between the host components.

Said ETSI technical specification implements a communication architecture that is organized so that the host controller administers a white list for each of the host components. A white list of a host component is intended to identify the other host components that are authorized to create a communication channel to it.

A communication channel is defined in said ETSI technical specification as being a logic link between two logic gates of different host components for conveying events, commands and responses that contain data for operating a service. A gate is a logic input point that makes it possible to access the services provided by a host component.

In particular, the protocol for creating a communication channel requires the target host component to register an authorized host component, which is responsible for creating the channel, in the white list of the target host component. If a host component responsible for a communication channel creation request to a target host component for this communication channel is not registered in the white list of the target host component, the communication channel creation request is rejected by the host controller.

FIG. 1 shows a flow chart of a conventional method as defined in said ETSI technical specification for administering a communication channel between a host component A and a host component B. The host controller HC administers the white lists WLA and WLB, respectively, of each of the host components A and B. In the initial phase, the white lists are empty. In a first step E11, the host component A transmits, to the host controller HC, a communication channel creation request for the host component B. As the white list WLB of the host B does not contain the identifier of the host A, the host controller rejects the creation request in a step E12. In the situation of FIG. 1, steps E11 and E12 are repeated twice and result in new rejections. In a step E13, the host component B updates its white list by registering the identifier of the host component A, HAID, in its white list WLB, thus authorizing the host component A to be able to create a communication channel to it. The host controller HC then sends, in step E14, a confirmation of the taking into account of the registration of the host component A in the white list WLB of the host component B. In a step E15, a new attempt to create a communication channel between A and B is transmitted, by way of a new request, by the host component A to the host controller HC. The controller HC verifies that the white list WLB of the host component B contains the identifier of the host component A and then assigns an available channel identifier to the communication channel creation request. In a step E16, the host controller HC notifies the host component B of the communication channel creation request transmitted by the host component A, along with the chosen channel identifier. In step E17, the host component B returns, to the host controller HC, a confirmation of acceptance of creation of the communication channel with the proposed channel identifier. In a step E18, the host controller HC notifies the host component A of the creation of the communication channel with the host component B, along with the identifier that has been assigned thereto.

The communication channel creation requests by the host responsible for these attempts are therefore initiated without the latter knowing whether or not it is registered in the white list of the target host component. Multiple communication channel creation attempts will therefore be rejected before the initiating host component is registered in the white list of the target host component. This has the result of needlessly generating traffic, occupying the bandwidth and resources of the host controller, and also of consuming power.

SUMMARY OF THE INVENTION

It is sought to improve the administration process for creating a communication channel and to mitigate the abovementioned problems.

More precisely, the invention relates to a method for administering a communication channel to a first host component in an NFC mobile device also comprising a host controller for administering at least one first white list intended to identify at least one second host component having a right to create the communication channel to the first host component H1. According to the invention, the method comprises the following successive steps:
  updating of the right of the second component in the first white list by the first host component,
  notification of the update to the second host component by the host controller.

According to one variant of the method, it also comprises a step of verification of the notification by the second host component and a step of controlling of the transmission of a communication channel creation request by the second host component depending on the result of the verification.

According to one variant of the method, the update is a registration of an identifier of the second host component in the first white list, and it also comprises a step of requesting creation of the communication channel by the second host component following the notification step.

According to another variant of the method, the update is an erasure of an identifier of the second host component from the first white list, and it also comprises a step of requesting deletion of the communication channel by the second host component or by the host controller following the notification step.

According to one variant, the notification is a message comprising at least one first parameter containing the identifier of the first host component.

According to another variant, the notification is a message also comprising at least one second parameter indicating a registration or erasure action.

Preferably, the notification is configured so that the format of the message is in conformity with the technical specification ETSI TS 102 622.

Also provided according to the invention is an NFC mobile device comprising at least one first and one second host component and a host controller for administering at least one first white list intended to identify at least the second host component having a right to create a communication channel to the first host component. According to the invention, the host controller also comprises a means for transmitting a notification of updating of the right to create the communication channel in the first white list to at least the second host component.

According to one variant of the device, the second host component comprises a means for verifying the notification and a means for controlling the transmission of a communication channel creation request depending on the result of the verification.

It will be noted that the first host component and the second host component are each one of the components chosen from the list of following integrated circuit components: eSE, UICC, eUICC, secure element, removable SIM, processor of the mobile device, SD memory card.

According to one variant, the host controller is hosted in an NFC integrated circuit.

Preferably, the host controller and the means for transmitting the update notification are configured so that the format of the message of the update notification is in conformity with the technical specification ETSI TS 102 622.

Also provided according to the invention is a computer program comprising means for executing the steps of the method according to any one of the previous embodiments when said program is executed on an NFC mobile device.

BRIEF DESCRIPTION OF THE DRAWINGS

Other features and advantages of the present invention will become more clearly apparent upon reading the following detailed description comprising embodiments of the invention that are given by way of nonlimiting examples and illustrated by the appended drawings, in which.

DETAILED DESCRIPTION OF THE PREFERRED EMBODIMENTS

Figure 1:
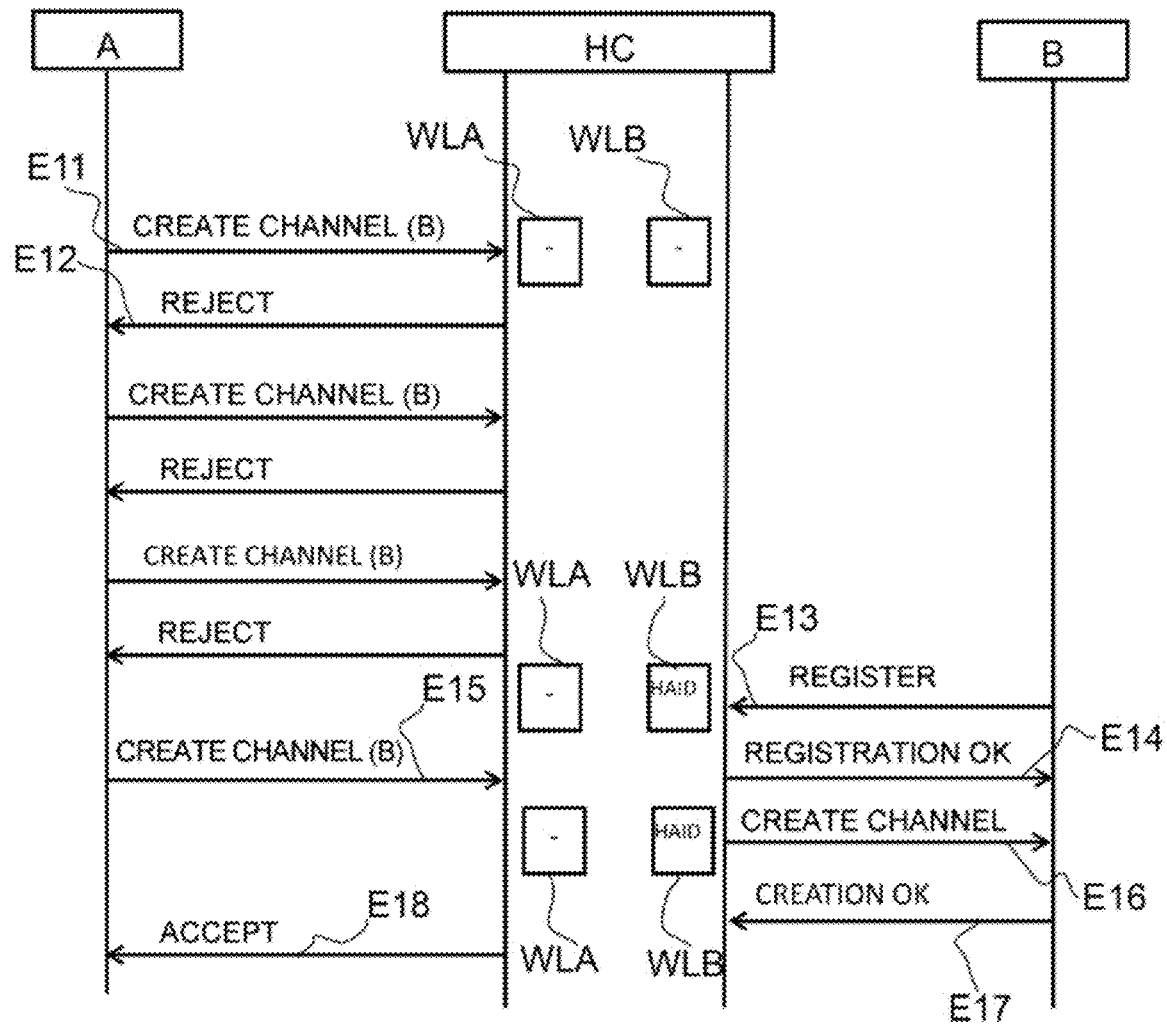
FIG. 1 shows a flow chart already described in the prior art for a method for administering a communication channel between a host component A and a host component B in an NFC mobile device.

The invention applies to the NFC mobile device and more particularly to the method for administering a communication channel between two host components as defined by the technical specification ETSI TS 102 622.FIG. 1 outlined in the description of the prior art describes the method for administering a communication channel between two host components.

Figure 2:
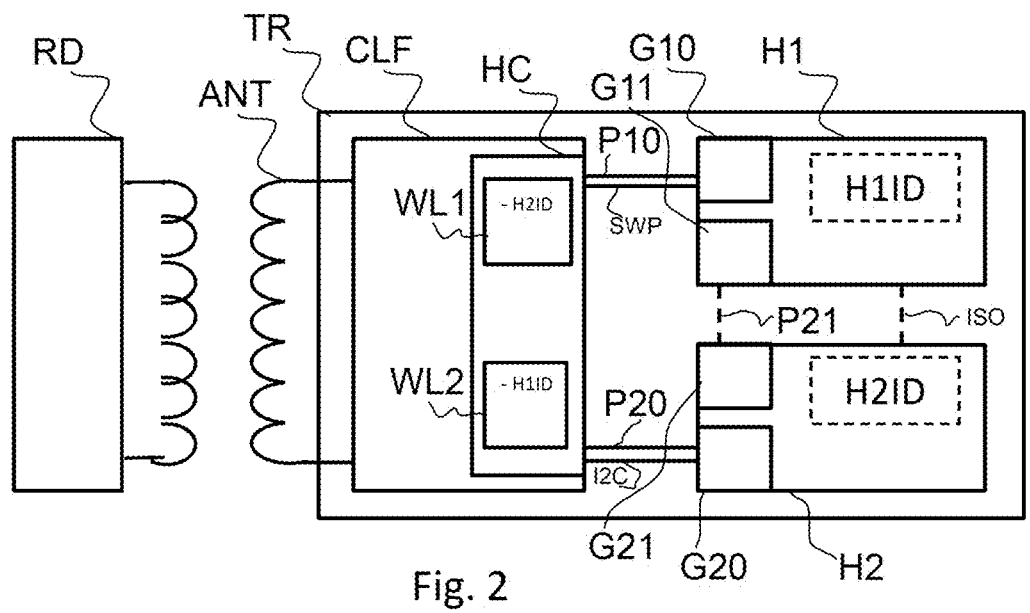
FIG. 2 shows an NFC mobile device able to implement the administration method according to the invention.

FIG. 2 shows an embodiment of an NFC mobile device, referenced TR, comprising at least two host components H1, H2 and an NFC integrated circuit, termed 'contactless front end' and denoted by the reference CLF, which is configured to operate contactless communications with a short range of around a few centimeters, for example in conformity with the ISO/IEC 14443 standard. The mobile device TR is a cellular mobile telephone, or in other variants is for example a multimedia device of tablet, watch, laptop or multimedia service terminal type or, more generally, any electronic object said to be communicating and having an NFC integrated circuit onboard. The integrated circuit CLF includes a radiofrequency antenna circuit ANT for the near-field transmission and reception of data. The antenna circuit ANT allows communication with an external electronic device RD compatible with the integrated circuit CLF, for example an external NFC card reader.

In one configuration shown in FIG. 2, the integrated circuit CLF is connected by a wired interface to at least two host components, a first one H1 and a second one H2, of the mobile device TR. A host component is an electronic component that is able to execute logic or software functions in order to operate a service. The integrated circuit CLF also comprises a host controller HC responsible in particular for managing communications via communication channels between the host components H1, H2 in compliance with the ETSI technical specification TS 102 622. The host components H1 and H2 are identified to the host controller HC by identifiers H1ID and H2ID, respectively. The identifiers of the host components are used in the creation of a communication channel.

In this configuration, the first host component H1 is a secure integrated circuit, for example of UICC or eUICC (for 'embedded UICC') type, a removable SIM card or eSIM (for 'embedded subscriber identification module') soldered card, or of eSE type, which is an integrated circuit that is sealed with respect to the other electronic components, to which access is not authorized and that is intended to protect sensitive data for any type of application.

Thus, the host component H1 hosts secrets, for example cryptographic keys, proprietary algorithms, or sensitive applications that it is necessary to protect. These are for example keys for authentication to a mobile telephony network, encryption keys for generating payment tokens, or banking applications. The first host component H1 has its own processor and at least one volatile memory and one non-volatile memory, and also its software operating system.

In this configuration, the second host component H2 is, for example, the processor of the mobile device TR allowing the software operating system of the device TR to operate. This second host component could very well also be, for example and without limitation, another secure element of eSE, UICC or eUICC type or else also a memory card of SD (for 'secure digital') type, for example. The second host component H2 interacts with at least volatile and non-volatile memories of the mobile device TR and also with other functional modules, depending on the configuration of the device (Wi-Fi, Bluetooth, etc. module). The software operating system of the device TR operates the communication functions of the mobile device TR and software mobile applications, for example a 'MIDIee' application.

The wired interface referenced SWP, linking the first host component H1 and the integrated circuit CLF, is a one-wired communication bus and operates in conformity with the SWP (for 'single wire protocol') protocol. The wired interface referenced ISO, linking the first host component H1 and the second host component H2, may be for example of ISO/IEC 7816 type or of SWP type, depending on the type of the secure integrated circuit of the first host component H1. The wired interface referenced I2C, linking the second host component H2 and the integrated circuit CLF, is for example an interface of I2C ('inter-integrated circuit') or SPI ('serial peripheral interface') type.

The integrated circuit CLF, the first and the second host component H1 and H2 allow the mobile device TR to operate in accordance with at least four service modes. The first mode is a 'reader mode' in which the first host component H1 is able to exchange with an external NFC card connected to the integrated circuit CLF via a wireless link. The second mode is a card mode ('card emulation') in which an external reader, connected via a wireless link to the integrated circuit CLF, is able to exchange data with the first host component H1. The third mode is what is called a 'connectivity' mode in which the first host component H1 transmits commands to the second host component H2 (exchanges being able to be either unidirectional, from the first host component H1 to the second host component H2, without the latter being able to respond directly to the received requests (for example in the case of the secure waking of a MIDIet application) or bidirectional for some specific commands). Lastly, the fourth mode is a generic mode in which the second host component H2 initiates a communication with the first host component H1, which will be able to respond thereto. With the link between the second host component H2 and the first host component H1 being able to use either a physical ISO link that is present between the two host components or to emulate such a link, this is then an 'ISO emulation' mode, well known under the term 'ISO gate', when the wired link is not present.

It will be noted that the mobile device TR may comprise other host components identified by the host controller HC, that is to say three or more host components, without departing from the scope of the invention. The other host components may be for example a screen, a keyboard, the baseband processor or a wireless (Wi-Fi, Bluetooth, etc.) radiofrequency communication integrated circuit, or a removable memory card of 'SD card' type. It may also be contemplated for the host controller HC to administer a communication channel between a host component of the device TR and a host component external to the mobile device TR, for example the external reader RD.

The host controller HC operates the functionalities provided in said abovementioned ETSI technical specification, and in particular administers the communication channels with and between the host components. A communication channel may be static, that is to say permanent, or dynamic, that is to say that it is able to be created and erased. The host components H1 and H2 comprise one or more logic gates (as they are called in the ETSI specification) that correspond to an input point of a communication channel. It is recalled that a communication channel allows a host component to use a service executed by another host component.

In the configuration described in FIG. 2, the first host component H1 comprises a gate G10 assigned to a static communication channel P10 with the host controller HC. The second host component comprises a gate G20 assigned to a static communication channel P20 with the host controller HC. The static communication channels P10 and P20 are used to transmit administration and/or configuration requests between a host component and the host controller. For example, the communication channel creation or erasure requests, or any type of event, command, response, notification of connection of a new host component or of erasure of communication channels, pass via these static communication channels.

The first host component H1 and the second host component H2 comprise a gate G11 and G21, respectively, for the assignment of a dynamic communication channel P21 between the two host components H1 and H2. The communication channel P21 allows the exchange of messages, that is to say, in the software sense, the exchange of events, commands and responses depending on the service in question. The method for administering the communication channel P21 will be described hereinafter by way of FIG. 3.

The host controller HC manages at least one white list WL1 of the first host component H1 and one white list WL2 of the second host component H2. A white list of a host component is intended to identify the other host components that have a right to create a communication channel to it. It will be noted that the host controller HC manages a white list for each of the host components identified to it, three or more white lists in the case where the terminal TR comprises three or more registered host components. A white list records one or more identifiers of authorized host components. In the configuration shown in FIG. 2, the white list WL1 of the host component 1 contains for example the identifier H2ID of the authorized host component H2. In this same configuration, the white list WL2 contains, for its part, the identifier H1ID of the authorized host component H1. The host controller HC is able to update the white list WL1 and the white list WL2 following a request to register or erase an authorized host component, the registration or erasure request being transmitted by the first host component H1 or the second host component H2 each in their own white list WL1 and WL2, respectively, for the first host component H1 and for the second host component H2.

Moreover, in the context of the operation of the method for administering a communication channel according to the invention, the host controller HC comprises a means for transmitting a notification of updating of a white list of a host component to another host component. This involves updating the right to create the communication channel in the white list WL1 or in the white list WL2. The notification is transmitted by the host controller HC to the host component that is registered in or erased from a white list. The host controller HC is a software entity operating the functions for producing the update notification and transmitting it. The notification makes it possible to inform a host component of its registration in or of its erasure from a white list, such that said host component transmits a communication channel creation request or that it stops transmitting a communication channel creation request. The notification then makes it possible to reduce needless information traffic.

It will be noted that it is possible for the host controller HC to comprise a configuration means for activating or deactivating the transmission of a notification of updating of a white list, for example by virtue of a configuration register of the integrated circuit CLF that makes it possible to configure a parameter for activating or deactivating the transmission of a notification of updating of a white list. The parameter is able to be configured by the host component that is or will be the target for a notification of updating of a white list. Reciprocally, it is provided that the host components of the mobile device TR comprise a means for transmitting a command to activate/deactivate the update notification.

In addition, in one variant of the mobile device TR, the first and the second host component H1 and H2 comprise a means for verifying the update notification and a means for controlling the transmission of a communication channel creation request depending on the result of the verification. For example, a software function verifies the content of the notification of updating of a white list, whether this is a registration in or erasure from a white list, and then authorizes or prevents transmission of the creation request, respectively, depending on the result of the verification. The verification may be the identification of a message conveying the notification or the identification of a parameter of a message conveying the notification.

In addition, in one variant of the verification means, the controlling of the transmission is a delay function, able to trigger the transmission of a communication channel creation request immediately after the reception of the registration notification or after a programmed delay.

Controlling the transmission of the creation request also has the technical effect of reducing needless information traffic. It is provided that the information of the notification is able to be stored in a non-volatile memory of the first and of the second host component H1, H2 in order to control the transmission of the communication channel creation request.

Figure 3:
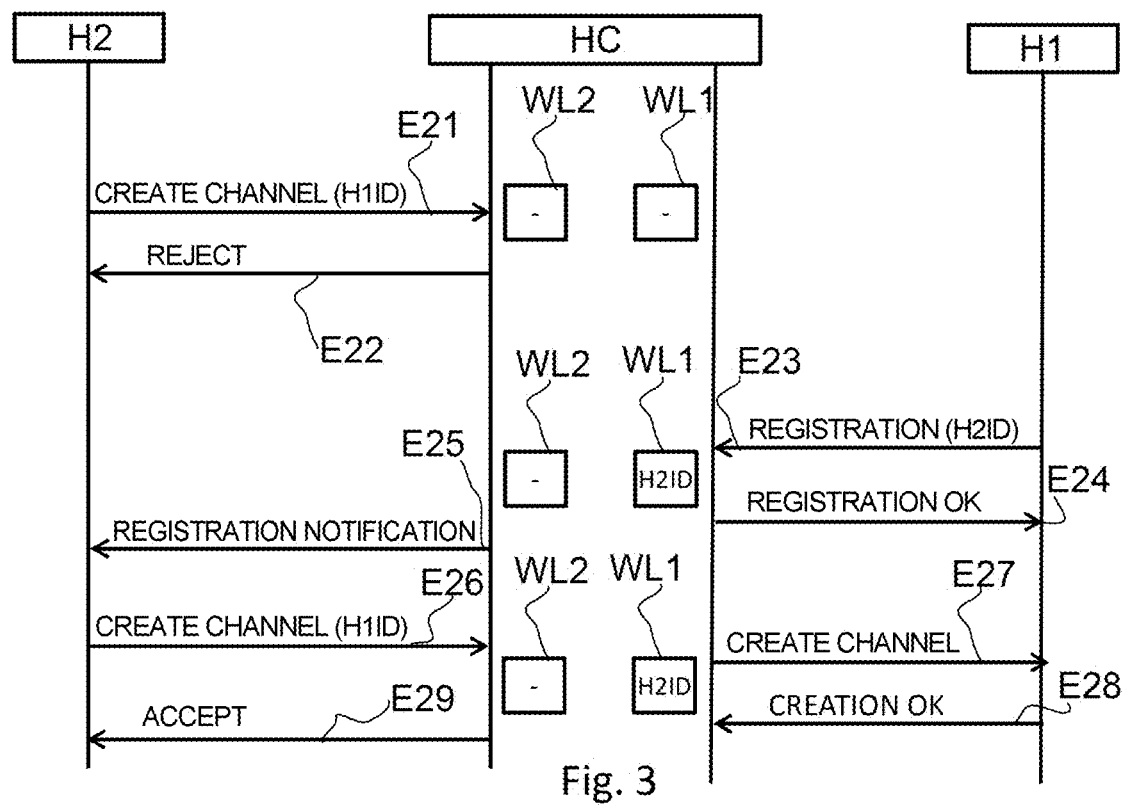
FIG. 3 shows an embodiment of the administration method according to the invention for creating a communication channel.

FIG. 3 shows an embodiment of the method for administering a communication channel according to the invention, in particular between the first and the second host component H1, H2. The method is implemented by any one of the variants of the NFC mobile device TR described previously. The administration method according to the invention is configured to be in conformity with the technical specification ETSI TS 102 622.

In an initial situation, the white list WL1 is empty and the white list WL2 is empty. As a result, the first host component H1 does not authorize the second host component H2 to create a communication channel to it, and vice versa. Nevertheless, it may be contemplated, without departing from the scope of the invention, for the white list WL1 and the white list WL2 to comprise host identifiers that are already stored before an initialization phase of the host controller HC.

In a step E21, the second host component H2 transmits a communication channel creation request to the host controller HC so that it assigns a channel identifier and that it authorizes the creation of a channel, starting from the second host component H2, to the first host component H1.

In a step E22, the host controller HC rejects the creation request because the white list WL1 of the first host component H1 does not contain the identifier of the second host component H2.

In a variant of the method, it may be provided that the second host component H2 prevents the transmission of a new channel creation request to the host component H1 after reception of the rejection notification E22 for as long as it does not receive a notification, from the host controller HC, that it is registered in the white list WL1. Controlling the transmission thus avoids needless data traffic.

However, in another variant, the second host component H2 may continue to transmit channel creation requests without specific control.

In this variant of the method, following the reception of the rejection notification E22, the second host component H2 no longer emits requests to create a communication channel with the first host component H1.

In a step E23, the first host component H1 executes an update of the right of the second component H2 in the first white list WL1, in this case the second host component H2 is registered in the white list WL1. A registration message containing the identifier of the host component H2 is transmitted to the host controller HC, for example a write message in a register of ANY_SET_PARAMETER (WL1, H2ID) type in conformity with said above mentioned ETSI technical specification. The white list WL1 then contains the identifier H21D of the host component H2. The host controller HC then sends, in step E24, a message acknowledging the taking into account of the registration of the host component H2 in the white list WL1 of the host component 1.

Next, the administration method according to the invention provides a step E25 of notification of the update E23 to the second host component H2 by the host controller HC. The notification is an event message (the case shown in FIG. 3) or, in another variant, a command message that then requests a response/acknowledgement on the part of the second host component H2. The notification E25 will be sent to the host component H2 in the event of successful updating, with the identifier H21D of the host component H2, of the white list WL1, by the host controller HC, following the update request E23 by the host component H1. The notification E25 is configured so that the format of the message is in conformity with the technical specification ETSI TS 102 622.

In the variant in which the notification E25 is an event message, the notification comprises at least one first parameter containing and encoding the type of action that has been performed by the host component H1 on its white list WL1, for example registration or erasure of the identifier H2ID of the host component H2 and at least one second parameter containing and encoding the identifier H1ID of the first host component H1 that has updated its white list WL1. One example of this notification, which is in no way limiting, is an event message EVT_NOTIF_WHITELIST_UPDATED [Action;Host ID].

In another variant, the notification E25 of updating of the white list may be represented by two separate events, one for the registration notifications and the other for the erasure notifications, with each of them, at least one parameter encoding and corresponding to the identifier of the host that has updated its white list. One example of this notification, which is in no way limiting, is an event message EVT_NOTIF_HOST_ADDED_IN_WHITELIST[Host ID] for the registration notifications and an event message EVT_NOTIF_HOST_DELETED_IN_WHITELIST[Host ID] for the erasure notifications.

In another variant in which the notification E25 is a command message, the notification E25 comprises at least one first parameter containing and encoding the type of action that has been performed by the host component H1 on its white list WL1, for example an action of registering or of erasing the identifier H2ID of the host component H2, in this case a registration, and at least one second parameter containing and encoding the identifier H1ID of the first host component that has updated its white list WL1. One example of this notification, which is in no way limiting, is a command message CMD_NOTIF_WHITELIST_UPDATED[Action;Host ID].

In another variant, the notification E25 of updating of the white list may be represented by two separate commands, one for the registration notifications and the other for the erasure notifications, with each of them, a parameter encoding and corresponding to the identifier of the host that has updated its white list. One example of this notification, which is in no way limiting, is a command message CMD_NOTIF_HOST_ADDED_IN_WHITELIST[Host ID] for the registration notifications and a command message CMD_NOTIF_HOST_DELETED_IN_WHITELIST[Host ID] for the erasure notifications.

It will be noted that, when the notification E25 is performed using a command message, the notified host component sends, in return, a response message to the host controller HC in order to return to it the result of the reception and of the execution of the notification E25 received previously from the host controller HC. The format of the response message returned by the notified host component is configured to be in conformity with the format of the messages of said above mentioned ETSI technical specification.

In one variant of the method, it is provided that it also comprises a step of verification of the notification E25 by the second host component H2 and a step of controlling of the transmission of a communication channel P21 creation request E26 by the second host component H2 depending on the result of the verification. Thus, in this situation, the second host component H2, after verification of the registration, authorizes and/or triggers the transmission of a communication channel P21 creation request to the first host component H1. In another variant, the transmission of a creation request is not controlled by the second component H2.

Thus, in a step E26, the method then comprises the channel creation request transmitted by the second host component H2 to the host controller HC. Upon reception of the request, the host controller HC verifies that the white list WL1 of the first host component H1 contains the identifier H2ID of the second host component H2 and then assigns an available channel identifier to the communication channel creation request. In a step E27, the host controller HC notifies the first host component H1 of the communication channel creation request on the part of the second host component H2, along with the chosen communication channel identifier. The first host component H1 then returns, in a step E28, to the host controller HC, a confirmation of acceptance of creation of the communication channel with the proposed channel identifier. In a step E29, the host controller HC notifies the second host component H2 of the creation of the communication channel P21 with the first host component H1, along with the identifier that has been assigned thereto. The communication channel P21 creation phase is in conformity with said above mentioned ETSI technical specification.

The method for administering a communication channel according to the invention also applies to an update of erasing an identifier of a host component from the white list of another host component. According to the invention, a step of notifying of the updating of the white list upon erasure is therefore also provided. As a result, the host component is no longer authorized to create a communication channel. A description will be given of the progress of the administration method for the erasure situation, retaining the references H1 and H2 for the first and second host components, respectively, when the first host component H1 erases the second host component H2 from its list.

According to a first erasure mode, the administration method provides a step of deleting the communication channel P21 on the initiative of the first host component H1, between the first host component H1 and the second host component H2, in conformity with said above mentioned ETSI technical specification. There then follows a step of notification of deletion of the communication channel P21, sent to the second host component H2, still in conformity with said ETSI technical specification.

The administration method then provides a step of erasing the identifier of the second host component H2 from the white list WL1 of the first host component H1, still in conformity with said above mentioned ETSI technical specification.

The administration method then comprises, and according to the invention, notification of the updating, this time erasure, of the white list WL1, to the second host component H2 by the host controller HC. The update (erasure) notification is transmitted when the white list WL1 is updated successfully, for example conditional upon an acknowledgement transmitted by the host controller HC.

In one variant of the first erasure mode, the method also comprises a step of verification of the notification by the second host component H2 and a step of controlling of the transmission of a communication channel creation request by the second host component depending on the result of the verification. In this situation, following the erasure notification, the host component H2 refrains from transmitting a communication channel creation request to the first host component H1. The method thus makes it possible to reduce needless data traffic.

In another variant, the transmission of a creation request is not controlled, even if it is refused by the host controller HC.

According to a second erasure mode, the administration method comprises a step of erasing the identifier of the second host component H2 from the white list WL1, and then a step of notification of both the host component H2 and the host component H1 (and all the other host components where applicable) by the host controller HC by way of a message of 'ADM_NOTIFY_ALL_PIPE_CLEARED'-type or 'ADM_NOTIFY_PIPE_DELETED'-type in conformity with said above mentioned ETSI technical specification.

Next, the method comprises the step of notification, by the host controller HC, of the updating (erasure) of the white list WL1 to the second host component H2. As in the first mode, the method comprises, in a variant of the second erasure mode, a step of verification of the notification by the second host component H2 and a step of controlling the transmission of a communication channel creation request to the first host component H1.

In another variant, the method does not provide for the verification or the control of the transmission of the creation request.

According to a third erasure mode, the administration method comprises a step of erasing the identifier of the second host component H2 from the white list WL1, and then a step of notifying the host component H2 of the deletion of its identifier from the white list WL1 of the host component H1, and then a communication channel deletion request step by the host component H2, said request being sent to the host controller HC, and the communication channel deletion is executed by the host controller HC.

According to a fourth erasure mode, the administration method comprises a step of erasing the identifier of the host component H2 from the white list WL1 of the host component H1, and then a step of notification, by the host controller HC, of the host component H2 of the deletion of its identifier from the white list WL1 of the host component H1, and then a step, initiated by the host controller HC, of deletion of the communication channel.

According to a fifth erasure mode, the administration method comprises a step of erasing the identifier of the second host component H2 from the white list WL1 of the host component H1, and then a step of notification of the host component H2, by the host controller HC, of the deletion of its identifier from the white list WL1 of the host component H1. The special feature of this erasure mode lies in the fact that the communication channel established beforehand between the host component H2 and the host component H1 is kept active. The host component H1 is no longer able to be called upon by the host component H2 with regard to new and future communication channel creation requests, this being the case for as long as the host component H2 is not reregistered in the white list WL1 of the host component H1. However, the service operations being executed via the communication channel created beforehand are kept operational for as long as the communication channel remains established.

It will be noted that the administration method has been described more specifically in a situation of updating the white list WL1 of the first host component H1 (of SIM, eSIM or eSE type), but the method applies to any type of host component of the mobile device TR and to all of the host components (two or more host components). The notification of updating by registration in or erasure from a white list is sent to one or more host components if the update relates to one or more host components.

In a different initial situation, at least one of the white lists is not empty in the initialization phase of the host network. For example, during an initialization phase of the host network, the host components register with the host controller HC so as to form the network of host components in which the latter are registered under an identifier number. When they are registered with the host controller, one of the steps consists, for each of the host components, in providing it with its white list. Once the white list is received by the host controller from the host component in question, and if it contains identifiers of host components, the host controller notifies the various hosts that are already registered with the host controller and that are listed in the received white list. The host components that are listed in the received white list but that are not yet registered with the host controller HC will be notified by the host controller HC once they have registered therewith.

Moreover, it will be added that steps of verification of the update notification by the host component H2 and of controlling the transmission of a communication channel creation request by the second host component H2 depending on the result of the verification may be executed for each of the above-described erasure modes of the administration method.

It will furthermore be added that the notification of updating of a white list may be an event or command message, as described in FIG. 3, for all of the erasure modes of the administration method.

The invention claimed is:

1. A method for administering a communication channel to a first host component in an NFC mobile device that also includes a host controller that administers at least one first white list that identifies at least one second host component having a right to create the communication channel to the first host component, said method comprising the following successive steps:
updating of the right of the second component in the first white list by the first host component; and
notification of the update to the second host component by the host controller,
wherein the notification is a message comprising at least one first parameter containing the identifier of the first host component, and
wherein the notification is a message also comprising at least one second parameter indicating a registration or erasure action.

2. The method as claimed in claim 1, further comprising:
a step of verification of the notification by the second host component and a step of controlling of the transmission of a communication channel creation request by the second host component depending on the result of the verification.

3. The method as claimed in claim 1, wherein the update is a registration of an identifier of the second host component in the first white list, and wherein said method also comprises a step of requesting creation of the communication channel by the second host component following the notification step.

4. The method as claimed in claim 1, wherein the update is an erasure of an identifier of the second host component from the first white list, and wherein said method also comprises a step of requesting deletion of the communication channel by the second host component or by the host controller following the notification step.

5. The method as claimed in claim 1, wherein the notification is configured so that the format of the message is in conformity with the technical specification ETSI TS 102 622.

6. An NFC mobile device, comprising:
a first host component;
a second host component; and
a host controller that administers at least one first white list that identifies at least the second host component having a right to create a communication channel to the first host component,
wherein the host controller also comprises a means for transmitting a notification of an updating of the right to create the communication channel in the first white list to at least the second host component,
wherein the notification is a message comprising at least one first parameter containing the identifier of the first host component, and
wherein the notification is a message also comprising at least one second parameter indicating a registration or erasure action.

7. The device as claimed in claim 6, wherein the second host component comprises a means for verifying the notification and a means for controlling the transmission of a communication channel creation request depending on the result of the verification.

8. The device as claimed in claim 6, wherein the first host component and the second host component are each one of the components selected from the group of integrated circuit components consisting of: eSE, UICC, eUICC, secure element, removable SIM, processor of the mobile device, and SD memory card.

9. The device as claimed in claim 6, wherein the host controller is hosted in an NFC integrated circuit.

10. The device as claimed in claim 6, wherein the host controller and the means for transmitting the update notification are configured so that the format of the message of the update notification is in conformity with the technical specification ETSI TS 102 622.

11. A non-transitory computer-readable medium on which is recorded a computer program that, upon execution by an NFC mobile device equipped with a first host component and a host controller that administers at least one white list that identifies at least one second host component having a right to create a communication channel to the first host component, causes the NFC mobile device to perform steps for administering the communication channel to the first host component in the NFC mobile device, the steps comprising:

updating the right of the second component in the first white list by the first host component, and transmitting a notification of the update to the second host component by the host controller, wherein the notification is a message comprising at least one first parameter containing the identifier of the first host component, and wherein the notification is a message also comprising at least one second parameter indicating a registration or erasure action.

12. The method as claimed in claim 2, wherein the update is a registration of an identifier of the second host component in the first white list, and wherein said method also comprises a step of requesting creation of the communication channel by the second host component following the notification step.

13. The method as claimed in claim 2, wherein the update is an erasure of an identifier of the second host component from the first white list, and wherein said method also comprises a step of requesting deletion of the communication channel by the second host component or by the host controller following the notification step.

14. The method as claimed in claim 2, wherein the notification is configured so that the format of the message is in conformity with the technical specification ETSI TS 102 622.

15. The device as claimed in claim 7, wherein the first host component and the second host component are each one of the components selected from the group of integrated circuit components consisting of: eSE, UICC, eUICC, secure element, removable SIM, processor of the mobile device, and SD memory card.

\* \* \* \* \*